United States Patent

Nowicki

[11] Patent Number: 5,141,016
[45] Date of Patent: Aug. 25, 1992

[54] DIVERTOR VALVE

[75] Inventor: Michael L. Nowicki, House Springs, Mo.

[73] Assignee: Dema Engineering Co., St. Louis, Mo.

[21] Appl. No.: 682,879

[22] Filed: Apr. 8, 1991

Related U.S. Application Data

[63] Continuation of Ser. No. 428,505, Oct. 27, 1989, abandoned.

[51] Int. Cl.$^5$ .................................................. F16K 11/044
[52] U.S. Cl. .................................................. 137/118; 137/872
[58] Field of Search .................. 137/118, 861, 881, 882, 137/110, 599, 119, 886, 872

[56] References Cited

U.S. PATENT DOCUMENTS

| | | | |
|---|---|---|---|
| 808,654 | 1/1906 | Hartgrave | 137/886 X |
| 1,178,221 | 4/1916 | Dittrich | 137/886 X |
| 1,524,225 | 1/1925 | Allen et al. | 137/886 X |
| 1,967,644 | 7/1934 | Williams | 137/118 |
| 2,618,291 | 11/1952 | Vestre | 137/599.1 |
| 3,329,164 | 7/1967 | Symonds et al. | 137/599 X |
| 3,986,523 | 10/1976 | Pacht | 137/882 |
| 4,241,754 | 12/1980 | Moen | 137/119 |
| 4,277,941 | 7/1981 | Povero | 137/882 |

FOREIGN PATENT DOCUMENTS 3239255 4/1984 Fed. Rep. of Germany ...... 137/467

Primary Examiner—Stephen M. Hepperle
Attorney, Agent, or Firm—Cohn, Powell & Hind

[57] ABSTRACT

This diverter valve (12) is used in conjunction with a faucet (14) and provides for partial diversion of the water supply to a chemical block feeder (20). The diverter valve includes a body 24 having an inlet (26) an outlet 28 and a connecting intermediate passage (32). A transverse diverter passage (42) on one side of the body 24 communicates with the intermediate passage (32) and the diverter passage is closed by an aligned plunger (50) mounted to the opposite side of the body (24). The plunger (50) is withdrawn from its closure position by pulling outwardly and is maintained in the open position by water pressure to partially divert water into the diverter passage (42) to supply diluted chemical into a sink (16).

8 Claims, 1 Drawing Sheet

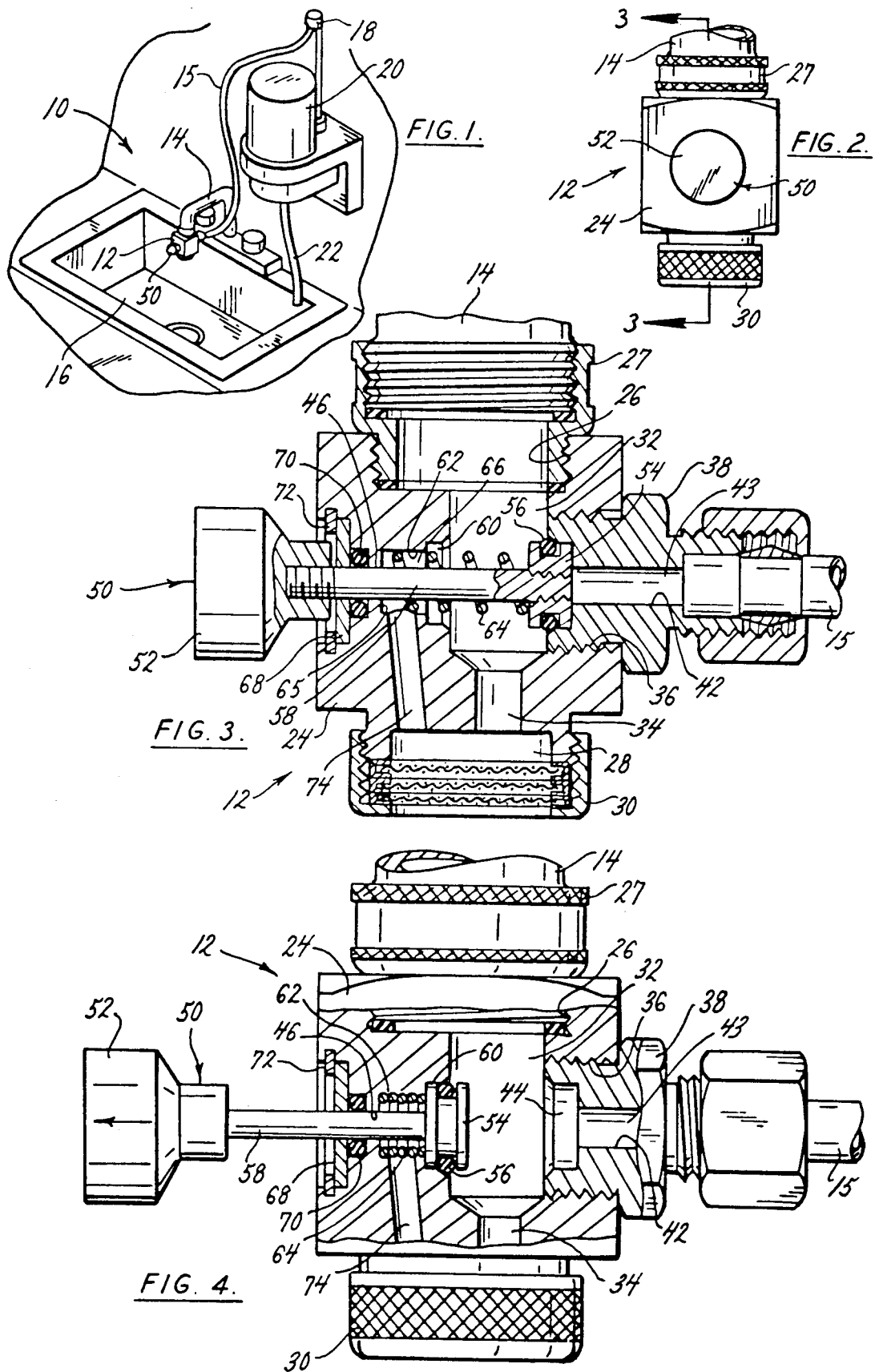

DIVERTOR VALVE

This is a continuation of copending application 07/428,505 filed on Oct. 27, 1989 now abandoned.

BACKGROUND OF THE INVENTION

This invention relates generally to valves used to divert liquid flow and particularly to a faucet-mounted valve for diverting a portion of the water flow over a chemical block to dissolve and dispense the chemical.

Diverter valves are commonly used in the plumbing industry to effectuate a complete diversion of the water supply from a tub to a shower in a bathroom. Typical of such valves is that disclosed in U.S. Pat. No. 4,241,754 in which a spring-biased diverter valve is used to selectively block the tub outlet or so that the supply is wholly diverted upwardly to the shower outlet. Similarly, U.S. Pat. No. 3,841,346 discloses a pivotable outlet with a spring-biased valve which is held in position by water pressure so that water is diverted to the shower, while U.S. Pat. No. 3,601,141 uses a spring-biased slide valve in which water is diverted to a tub outlet or a shower outlet depending on the position of the slide.

In none of these valves or any other known prior art is there a disclosure of a valve which is intended to divert only a portion of a water flow from a continuous supply.

SUMMARY OF THE INVENTION

This diverter valve provides for the diversion of a portion of a water faucet supply to a chemical supply so that the resulting chemical solution can be selectively mixed with the remaining portion of the water faucet supply.

This diverter valve comprises a body including a first passage means extending therethrough and having an inlet opening at one end, and an outlet opening at the other end, and a second, transversely disposed, diverter passage means communicating with said first passage means between said ends at one side of the body, said second passage means having a valve seat, and a diverter member mounted to the other side of said body, said diverter member including an inner end portion disposed inside the body, an outer end portion disposed outside the body and an intermediate portion connecting said inner and outer end portions, said inner and portion being movable between a closed position engageable with said diverter passage valve seat and an open position spaced from said valve seat, said diverter member extending across the first passage means in the closed position and being adapted to permit flow through the first passage means when the inverter passage means open and also when the diverter passage means is closed.

It is an aspect of this invention to provide that the diverter member includes means spring-biasing said member into the closed position.

It is another aspect of this invention to provide that the inlet opening and the outlet opening are substantially axially aligned and the first passage means includes an intermediate portion offset from the axis of alignment of the inlet and outlet openings.

It is still another aspect of this invention to provide that the first passage means includes an auxiliary passage portion operatively communicating between said intermediate passage portion and said outlet opening when the diverter member is in the closed position.

It is yet another aspect of this invention to provide that the valve body includes a transverse mounting passage substantially axially aligned with said second diverter passage means and including a spring housing having an abutment, said diverter member is a plunger having a knob providing said outer end portion, a valve disc providing said inner end portion and a reduced diameter rod extending between said knob and said disc, and a biasing spring is disposed in said housing between said disc and said abutment.

An aspect of this invention is to provide an auxiliary passage portion extending between said said mounting passage and said outlet opening and operatively communicating with said intermediate passage portion when the plunger is in the closed position.

Another aspect of this invention is to provide that said intermediate passage portion and said auxiliary passage portion are disposed in side-by-side relation and said auxiliary passage communicates with said spring housing.

Still another aspect of this invention is to provide that said valve seat is recessed, and the plunger valve disc is received within said recessed valve seat, and to provide that the reduced diameter rod and the recessed disc minimize obstruction of flow through said first passage means when said diverter member is in the closed position.

Yet another aspect of this invention is to provide that the plunger is mounted in a mounting passage having a recessed portion receiving said valve disc when said plunger is in said open position.

It is another aspect of this invention to provide a chemical mixing system comprising a water faucet, a receptacle, a diverter valve attached to the faucet, said valve including a first passage means directing water through the valve and into the receptacle, a second, diverter passage means transverse to the first passage means and communicating with said first passage means, and a diverter member selectively opening and closing said diverter passage, and being adapted to permit flow through the first passage means when the diverter passage means is open and when the diverter passage means is closed, and a chemical block feeder including means communicating with the diverter passage means and means communicating with the receptacle whereby a chemical solution is selectively supplied to the receptacle.

It is an aspect of this invention to provide a diverter valve and mixing system which are inexpensive to manufacture, easy to use, and efficient in operation.

BRIEF DESCRIPTION OF THE DRAWINGS

FIG. 1 is a perspective view of a system using the diverter valve;

FIG. 2 is a side view of the diverter valve;

FIG. 3 is a cross sectional view taken on line 3—3 of FIG. 2 showing the valve in a closed condition; and FIG. 4 is a cross sectional view similar to FIG. 3 showing the valve in an open condition.

DESCRIPTION OF THE PREFERRED EMBODIMENT

Referring now by reference numerals to, the drawings and first to FIG.. 1, it will be understood that the diverter valve 12 is utilized in a chemical dilution system generally indicated by 10. As shown, the diverter valve 12 is mounted to a faucet 14 which provides a continuous supply of water to a receptacle or container such as a sink 16. When desired, a portion of the water flow can be diverted by the diverter valve 12 via line 15 and a syphon breaker 18 to a solid block chemical feeder 20 to provide a diluted chemical solution discharge into the sink 16 through a line 22 to mix with the remaining portion of the water. The diversion of the water flow is accomplished by simply pulling out a plunger 50. The rate of chemical supply into the sink 16 is determined by the rate of water diverted to the feeder 20 from the diverter valve 12, which will now be described by reference to FIGS. 2–4.

The diverter valve 12 includes a valve body 24 having an inlet opening 26 and being connectible to the externally threaded faucet 14 directly or by means of a hose connector 27 having appropriate washers, and an externally threaded outlet opening 28 receiving a filter cap 30. The inlet and outlet openings 26 and 28 are interconnected by an intermediate, reduced diameter passage portion 32 further reduced at the lower end 34 to communicate with the outlet opening 28 said openings 26 and 28 and said passages 32 and 34, constituting a first passage means. In the embodiment shown the openings 26 and 28 are axially aligned and the passages 32 and 34 are axially offset from said openings.

The body also 24 also includes a transverse threaded opening 36 receiving a fitting 38 connected to the syphon breaker 18 by a line 15. The fitting 38 is bored to provide a transverse diverter passage 42, constituting a second passage means communicating between the intermediate passage portion 32 and the line 15 and having an end recess 44 and a metering portion 43 appropriately sized to determine the rate of flow diverted to the feeder 20. The body 24 also includes a axially aligned with the passage 42 and receiving a plunger 50, constituting a diverter member. The plunger 50 includes a knob 52 at the outer end, and a disc element 54 at the inner end, grooved to receive an O-ring 56, said disc element 54 being threadedly connected to a rod 58 which interconnects said knob 52 and said disc element 54.

The mounting passage 46 includes an end recess 60 receiving said disc element 54, when the diverter member is in the open, retracted position and a reduced bore portion 62 defining an abutment 65 and housing a spring 64 engagingly disposed in retained relation on said rod 58 between said abutment and said disc element. The plunger 50 is supported within the mounting passage between a passage portion 66 and a sealed washer 68, said body being counterbored to receive an O-ring 70 and said washer 68 being held in place by a snap-ring 72. Finally, an auxiliary passage 74 is provided, disposed in side-by-side relation with said intermediate passage portion 32, extending between said spring housing 62 and said outlet opening 28 and providing part of said first passage means.

In operation, when clear water only is desired the spring 64 biases the plunger 50 into the closed position shown in FIG. 3. In this position, the diverter passage 42 is closed and water passes from the inlet opening 26 through the intermediate passage 32, and also the auxiliary passage 74 into the outlet opening 26. The disc element 54 is received within the recess 44 and together with the reduced diameter connecting rod 58, which is substantially smaller in diameter that the diameter of the passage 32, provides a minimum obstacle to flow.

When it is desired to introduce chemical into the sink by diverting water from passage 32 into diverter passage 42, it is simply a matter of grasping the knob 52 and pulling the plunger 50 outwardly against the force of the biasing spring 64. This action causes the disc element 54 to move into the mounting passage recess 60. Because of the pressure of water flowing through the passage 32 the plunger 50 stays in this retracted position so that water flow from the faucet is partially diverted to the chemical feeder block 20 through line 15 and syphon breaker 18 and discharged into the sink 16 through line 22. The rate of diversion depends on the flow of water through the diverter valve 12, which is determined by the size of the metering passage 43. The flow rate can be adjusted by substituting a fitting 38 having a different size metering passage 43. Alternatively, the flow rate can be determined by metering means (not shown) associated with the feeder block 20. When the water flow is cut off by turning of the faucet, the Although the diverter valve has been described by making detailed reference to a preferred embodiment, the details of description are not to be understood as restrictive numerous variants being possible within the scope of the claims hereunto appended.

I claim as my invention:

1. A diverter valve, comprising:
   (a) body including first passage means extending therethrough, said passage means having an inlet opening at one end, and an outlet opening at the other end, said second transversely disposed, diverter passage means communicating with said first passage means between said ends at one side of the body, said second passage means having a valve seat, and
   (b) diverter member slidingly mounted to the other side of said body and including an inner end portion disposed inside the body, an outer end portion disposed outside the body and an intermediate portion connecting said inner and outer end portions, said inner end portion being movable between a closed position engageable with said valve seat and an open position spaced from said valve seat,
   (c) said diverter member extending across the first passage means in the closed position and being adapted to permit flow through the first passage means when the diverter passage means is open and when the diverter passage means is closed so that there is always flow through the first passage means both when the diverter member is in the closed position and when the diverter member is in the open position, and
   (d) the diverter member including means spring-biasing said member into the closed position.

2. diverter valve as defined in claim 1 in which:
   (e) said valve seat is recessed, and
   (f) the diverter member is a plunger having a knob providing said outer end portion, a valve disc providing said inner end portion and being received within said recessed valve seat, and a reduced diameter rod providing said intermediate portion and extending between said knob and said disc, to minimize obstruction of flow through said first passage means when said diverter member is in the closed position.

3. A diverter valve, comprising:

(a) a body including first passage means extending therethrough, said passage means having an inlet opening at one end, and an outlet opening at the other end, and second, transversely disposed, diverter passage means communicating with said first passage means between said ends at one side of the body, said second passage means having a valve seat, and (b) a diverter member mounted to the other side of said body and including an inner end portion disposed inside the body, an outer end portion disposed outside the body and an intermediate portion connecting said inner and outer end portions, said inner end portion being movable between a closed position engageable with said valve seat and an open position spaced from said valve seat, (c) said diverter member extending across the first passage means in the closed position and being adapted to permit flow through the first passage means when the diverter passage means is open and when the diverter passage means is closed so that there is always flow through the first passage means both when the diverter member is in the closed position and when the diverter member is in the open position, and (d) the inlet opening and the outlet opening being substantially axially aligned and the first passage means including an intermediate portion offset from the axis of alignment.

4. A diverter valve as defined in claim 3, in which:

(e) the first passage means includes an auxiliary passage portion disposed in side-by-side relation with said intermediate passage portion and operatively communicating between said intermediate passage portion and said outlet opening and providing part of said first passage means when the diverter member is in the closed position.

5. A diverter valve, comprising:

(a) a body including first passage means extending therethrough, said passage means having an inlet opening at one end, and an outlet opening at the other end, and second, transversely disposed, diverter passage means communicating with said first passage means between said ends at one side of the body, said second passage means having a valve seat, and (b) a diverter member mounted to the other side of said body and including an inner end portion disposed inside body and including an inner end portion disposed inside the body, an outer end portion disposed outside the body and an intermediate portion connecting said inner and outer end portions, said inner end portion being movable between a closed position engageable with said valve seat and an open position spaced from said valve seat, (c) said diverter member extending across the first passage means in the closed position and being adapted to permit flow through the first passage means when the diverter passage means is open and when the diverter passage means is closed so that there is always flow through the first passage means both when the diverter member is in the closed position and when the diverter member is in the open position, and (d) the valve body including a transverse mounting passage substantially axially aligned with said second diverter passage means and including a spring housing having an abutment, (e) said diverter member being a plunger having a knob providing said outer end portion, a valve disc providing said inner end portion and a reduced diameter rod extending between said know and said disc, and (f) a biasing spring being disposed in said chamber between said disc and said abutment.

6. A diverter valve as defined in claim 5, in which:

(g) the inlet opening and the outlet opening are substantially axially aligned and the first passage means includes an intermediate passage portion offset from the alignment axis, and an auxiliary passage portion extending between said said mounting passage and said outlet opening and operatively communicating with said intermediate passage portion when the plunger is in the closed position.

7. A diverter valve as defined in claim 6, in which:

(h) said intermediate passage portion and said auxilliary passage portion are disposed in side-by-side relation and said auxiliary passage communicates with said spring chamber.

8. A diverter valve, comprising:

(a) a body including first passage means extending therethrough, said passage means having an inlet opening at one end, and an outlet opening at the other end, and second, transversely disposed, diverter passage means communicating with said first passage means between said ends at one side of the body, said second passage means having a valve seat, and (b) a diverter member slidingly mounted to the other side of said body and including an inner end portion disposed inside the body, an outer end portion disposed outside the body and an intermediate portion connecting said inner and outer end portions, said inner end portion being movable between a closed position engageable with said valve seat and an open position spaced from said valve seat, (c) said diverter member extending across the first passage means in the closed position and being adapted to permit flow through the first passage means when the diverter passage means is open and when the diverter passage means is closed sot that there is always flow through the first passage means both when the diverter member is in the closed position and when the diverter member is in the open position; and (d) said valve seat being recessed, and (e) the diverter member being a plunger having a knob providing said outer end portion disposed outside of the body, a valve disc providing said inner end portion and being received within said recessed valve seat, and a reduced diameter rod providing said intermediate portion and extending between said knob and said disc, to minimize obstruction of flow through said first passage means when said diverter member is in the closed position, and (f) the plunger being mounted in a mounting passage, said passage having a recessed portion receiving said valve disc when said plunger is in said open position.

(g) the diverter member including means spring biasing said member into the closed position.

* * * * *